United States Patent
Spivey et al.

(10) Patent No.: US 10,082,082 B2
(45) Date of Patent: Sep. 25, 2018

(54) FUEL INJECTOR WITH MULTI TUBE GAS DISTRIBUTION

(71) Applicant: SOLAR TURBINES INCORPORATED, San Diego, CA (US)

(72) Inventors: Sean Kelly Spivey, San Diego, CA (US); Donald James Cramb, San Diego, CA (US); James Scott Piper, San Diego, CA (US); Michael John Ramotowski, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 360 days.

(21) Appl. No.: 14/988,588

(22) Filed: Jan. 5, 2016

(65) Prior Publication Data
US 2017/0191421 A1    Jul. 6, 2017

(51) Int. Cl.
| F02C 1/00 | (2006.01) |
| F02C 7/22 | (2006.01) |
| F23R 3/28 | (2006.01) |

(52) U.S. Cl.
CPC ............. *F02C 7/222* (2013.01); *F23R 3/28* (2013.01); *F05D 2220/32* (2013.01)

(58) Field of Classification Search
CPC .... F02C 7/22; F02C 7/222; F23R 3/28; F23R 3/283; F23R 3/286; F23R 3/14; F23R 3/36; F05D 2260/30
See application file for complete search history.

(56) References Cited

U.S. PATENT DOCUMENTS

| 5,463,997 | A | 11/1995 | Cutler | |
| 7,121,481 | B2 | 10/2006 | Berglund et al. | |
| 2007/0234724 | A1* | 10/2007 | Prociw | F02C 7/222 60/740 |
| 2008/0066720 | A1* | 3/2008 | Piper | F23R 3/283 123/470 |
| 2008/0191063 | A1 | 8/2008 | Boehland et al. | |
| 2011/0016866 | A1 | 1/2011 | Boardman et al. | |
| 2011/0265482 | A1 | 11/2011 | Parsania et al. | |
| 2013/0247574 | A1* | 9/2013 | Patel | F02C 7/222 60/734 |
| 2014/0332602 | A1* | 11/2014 | Cramb | B01F 5/06 239/104 |
| 2014/0338339 | A1* | 11/2014 | Westmoreland | F23R 3/12 60/737 |

FOREIGN PATENT DOCUMENTS

EP    2090630    8/2009

* cited by examiner

*Primary Examiner* — Craig Kim
*Assistant Examiner* — Edwin Kang
(74) *Attorney, Agent, or Firm* — Procopio, Cory, Hargreaves & Savitch LLP

(57) ABSTRACT

A fuel injector for a gas turbine engine is disclosed. The fuel injector includes a flange assembly with a distribution block, three main gas tubes, and an injector head. The distribution block evenly distributes a main gas fuel to the three main gas tubes. The injector head includes an injector body with a primary gas gallery including an annular shape. The three main gas tubes are connected in a parallel configuration between the distribution block and the primary gas gallery. The three main gas tubes are all in flow communication with the primary gas gallery and provide the main gas fuel from the same main gas fuel source.

14 Claims, 12 Drawing Sheets

FUEL INJECTOR WITH MULTI TUBE GAS DISTRIBUTION

TECHNICAL FIELD

The present disclosure generally pertains to gas turbine engines, and to a fuel injector with a multi-tube gas distribution circuit.

BACKGROUND

Gas turbine engines include compressor, combustor, and turbine sections. The combustor includes fuel injectors that supply fuel for the combustion process. Variations in the thermal expansion of multiple fuel lines may cause deflections in the fuel injector head.

U.S. Pat. No. 7,121,481 to Berglund et Al. discloses a fuel injector having a chamber with a fuel inlet and a plurality of fuel outlets, and including a fuel distributor that is arranged in the chamber for the purpose of distributing fuel introduced into the chamber via the fuel inlet to the outlets. The fuel distributor includes a generally rotary symmetric distributor body.

The present disclosure is directed toward overcoming one or more of the problems discovered by the inventors.

SUMMARY OF THE DISCLOSURE

In embodiments, a fuel injector for a gas turbine engine is disclosed herein. The fuel injector includes a first primary tube, a second primary tube, a secondary tube, a flange assembly, and an injector head. The flange assembly includes a flange, a distribution block, a gas inlet passage, a primary gas fitting, a first primary passage, a second primary passage, and a secondary passage. The distribution block evenly distributes a main gas fuel to the first primary tube, the second primary tube and the secondary tube. The distribution block extends from the flange. The gas inlet passage extends into the distribution block. The primary gas fitting supplies the main gas fuel to the distribution block. The primary gas fitting is in flow communication with the gas inlet passage. The first primary passage is in flow communication with the gas inlet passage and the first primary tube. The second primary passage is in flow communication with the gas inlet passage and the second primary tube. The second primary passage and the secondary tube are in a parallel configuration with the first primary passage and the first primary tube. The secondary passage is in flow communication with the gas inlet passage and the secondary tube. The secondary passage and the secondary tube are in a parallel configuration with the first primary passage and the first primary tube, and in a parallel configuration with the second primary passage and the secondary tube.

The injector head includes an injector body including a primary gas gallery, a first primary fuel transfer fitting, a second primary fuel transfer fitting, and a secondary fuel transfer fitting. The primary gas gallery includes an annular shape. The first primary fuel transfer fitting is in flow communication with the primary gas gallery and is connected to the first primary tube for directing the main gas fuel from the first primary tube into the primary gas gallery. The second primary fuel transfer fitting is in flow communication with the primary gas gallery and is connected to the second primary tube for directing the main gas fuel from the second primary tube into the primary gas gallery. The secondary fuel transfer fitting is in flow communication with the primary gas gallery and is connected to the secondary tube for directing the main gas fuel from the secondary tube into the primary gas gallery.

DETAILED DESCRIPTION

The systems and methods disclosed herein include a fuel injector for a gas turbine engine. In embodiments, the fuel injector includes a distribution block that splits the main gas fuel in three ways when supplying fuel to an injector head. The distribution block is configured to evenly supply fuel through three main gas tubes, which may result in similar thermal expansion within each tube. Matching the thermal expansion in each main gas tube may prevent deformation of the main gas tubes and may prevent deflection of the injector head.

Figure 1:
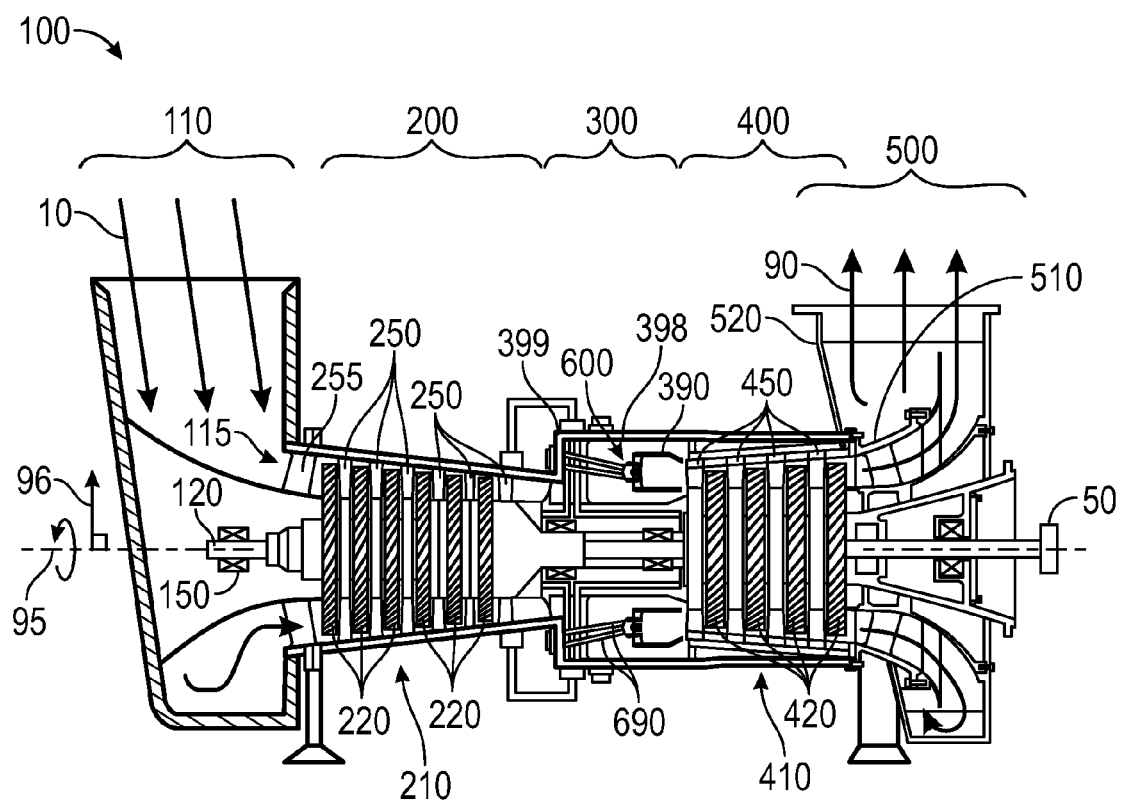
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 50. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 600 and includes one or more combustion chambers 390. Each fuel injector 600 includes a flange assembly 610, an injector head 630, and fuel tubes 690 extending between the flange assembly 610 and the injector head 630. In the gas turbine engine shown, each fuel injector 600 is installed into combustor 300 in the axial direction relative to center axis 95 through radial case portion 399 of combustor case 398 or the compressor diffuser case.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520.

Figure 2:
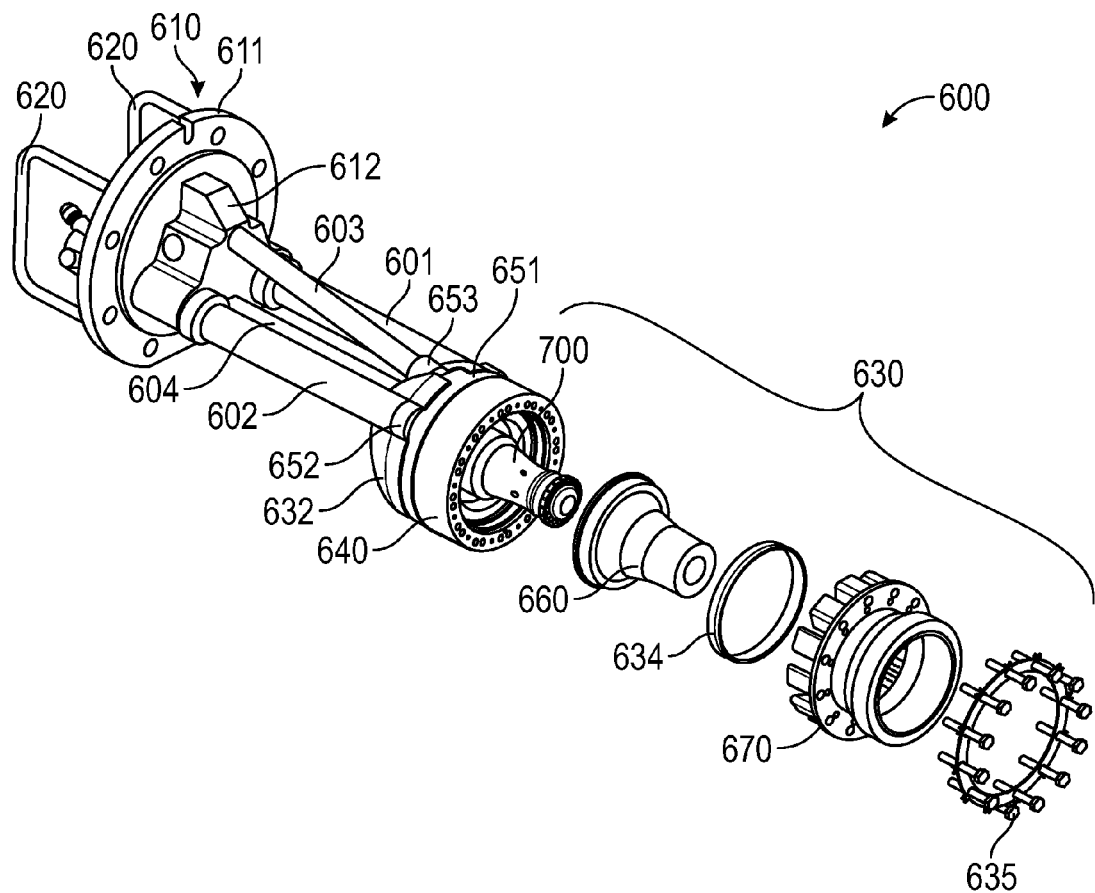
FIG. 2 is an exploded view of the fuel injector of FIG. 1.

The fuel injector 600 may include multiple fuel circuits for delivering fuel to the combustion chamber 390. FIG. 2 is an exploded view of the fuel injector 600 of FIG. 1. Referring to FIG. 2, the flange assembly 610 may include a flange 611, a distribution block 612, fittings, and handles 620. A single fitting may be used for each fuel circuit. The flange 611 may be a cylindrical disk and may include holes for fastening the fuel injector 600 to the combustor case 398.

The distribution block 612 extends from the flange 611 and may extend in the axial direction of the flange 611. The flange 611 and the distribution block 612 may be formed as an integral piece. The distribution block 612 may act as a manifold for one or more of the fuel circuits to distribute the fuel flow of one or more of the circuits through multiple fuel tubes or passages.

The fuel tubes 690 may include a first primary tube 601, a second primary tube 602, a secondary tube 603, and a tube stem 604. The first primary tube 601 and the second primary tube 602 may be part of a primary main gas fuel circuit. The first primary tube 601 and the second primary tube 602 may be parallel and may extend parallel to the assembly axis 797.

The secondary tube 603 may be part of the primary main gas fuel circuit or may be part of a secondary main gas fuel circuit. The secondary tube 603 may extend from the distribution block 612 to the injector head at an angle relative to the first primary tube 601 and the second primary tube 602, and may act as a support tube for the injector head 630 to prevent deflection of the injector head 630. The tube stem 604 may include passages for a main liquid fuel circuit, a pilot liquid fuel circuit, and a pilot gas fuel circuit.

The injector head 630 may include an injector body 640, an outer cap 632, an inner premix tube 660, an outer premix barrel 670, a center body assembly 700, a lock ring 634, and fasteners 635. The injector body 640 may include a first primary fuel transfer fitting 651, a second primary fuel transfer fitting 652, and a secondary fuel transfer fitting 653. The first primary tube 601 may connect to the injector head 630 at the first primary fuel transfer fitting 651. The second primary tube 602 may connect to the injector head 630 at the second primary fuel transfer fitting 652, and the secondary tube 603 may connect to the injector head 630 at the secondary fuel transfer fitting 653.

The outer cap 632 may connect to the injector body 640 and may be located between the injector body 640 and the flange assembly 610. The outer cap 632 may include openings that allow compressor discharge air to enter into the injector head 630.

The flange assembly 610, the gas tubes, liquid tubes, tube stem 604, the injector body 640, the inner premix tube 660, the outer premix barrel 670, and the center body assembly 700 include or may be assembled to form passages for the main gas fuel circuit(s), the main liquid fuel circuit, the pilot liquid fuel circuit, and the pilot gas fuel circuit. Embodiments of these fuel circuits are disclosed herein and will be discussed in association with the remaining figures.

The lock ring 634 and the fasteners 635 may be used to hold the various components together. The lock ring 634 may be used to secure the inner premix tube 660 to the injector body 640.

Figure 3:
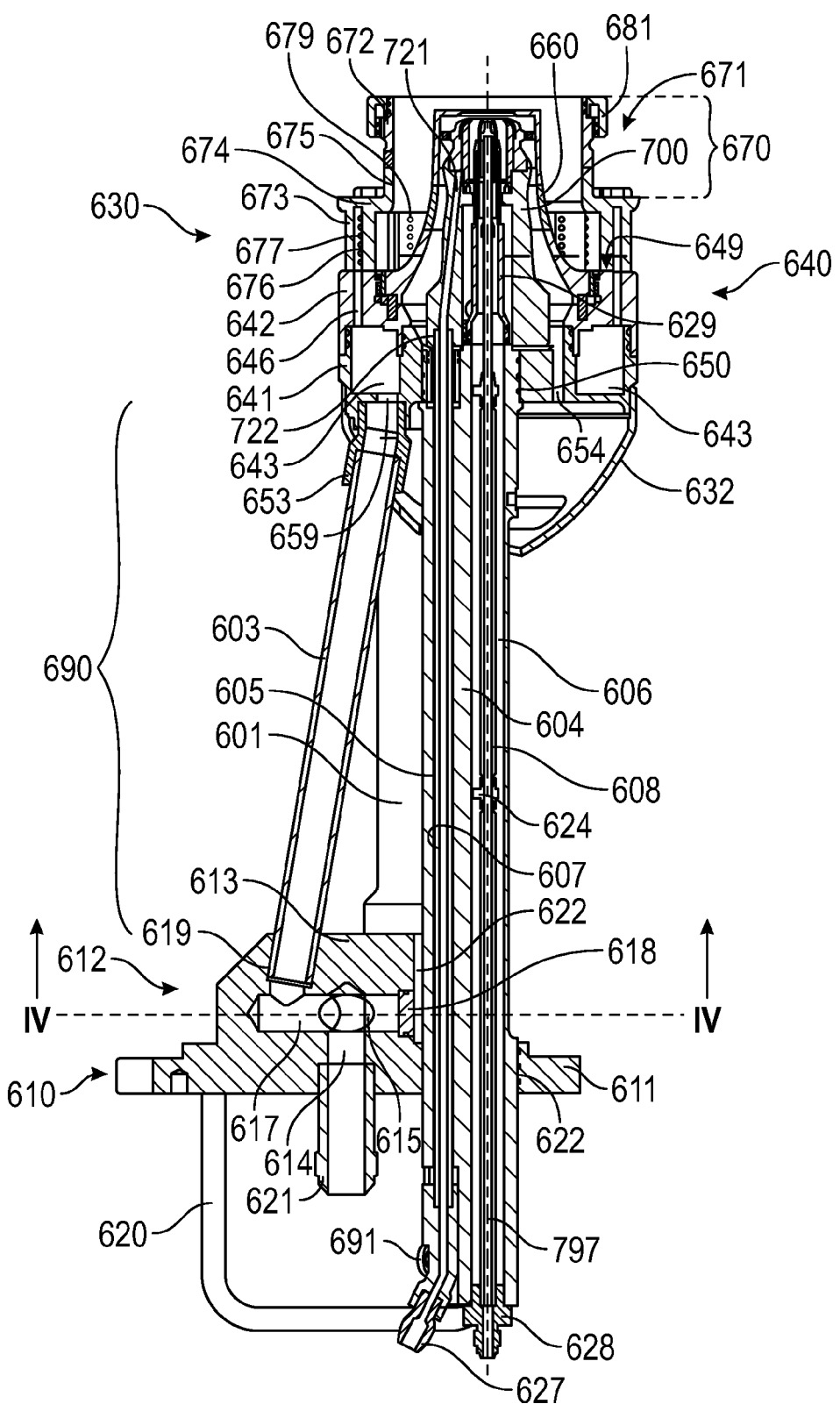
FIG. 3 is a cross-sectional view of an embodiment of the fuel injector of FIG. 2.
Figure 4:
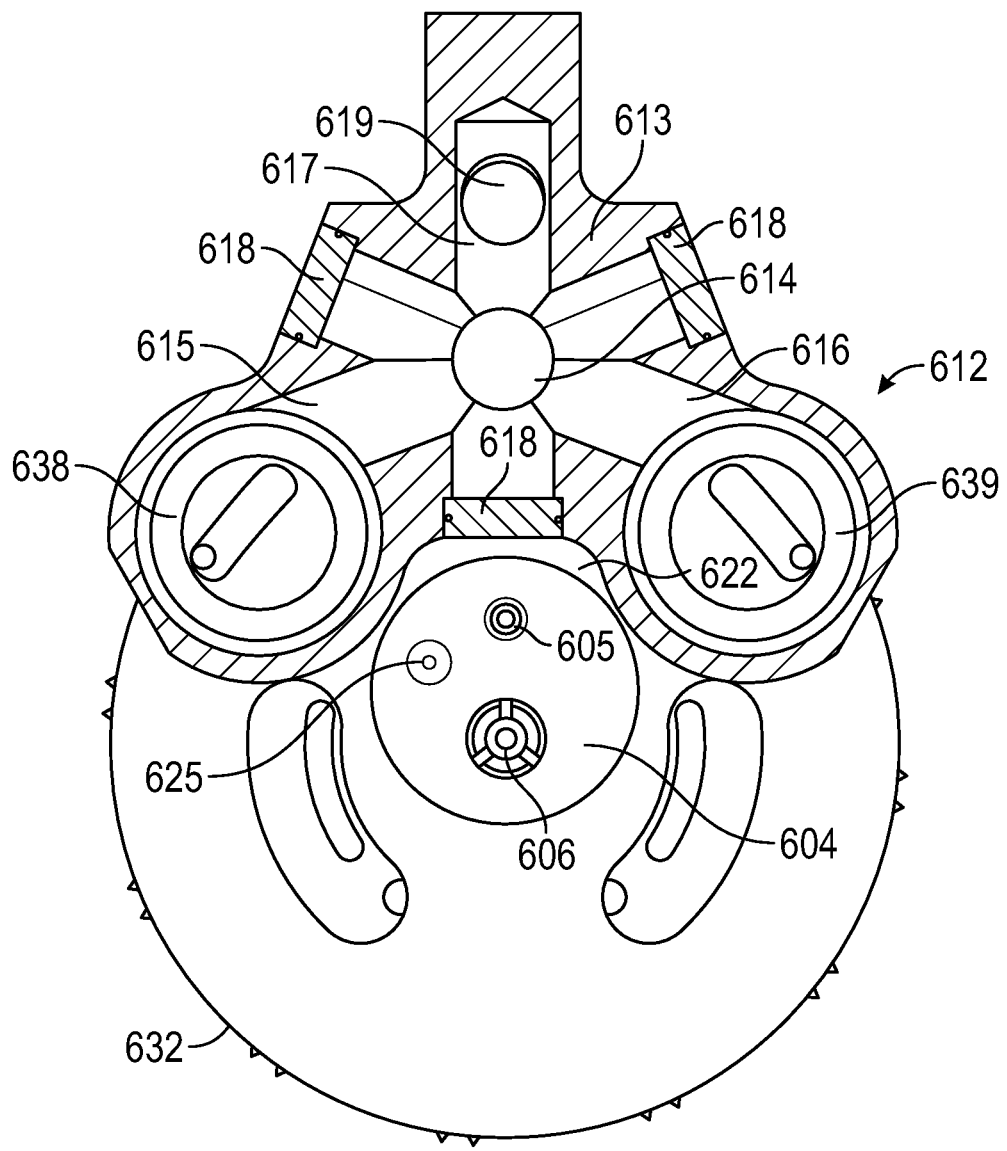
FIG. 4 is a cross-sectional view of the distribution block of FIGS. 2 and 3 taken along line IV-IV.

FIG. 3 is a cross-sectional view of an embodiment of the fuel injector 600 of FIG. 2. FIG. 4 is a cross-sectional view of the distribution block 612 of FIGS. 2 and 3 taken along line IV-IV. In the embodiment illustrated in FIGS. 3 and 4, the first primary tube 601, the second primary tube 602, and the secondary tube 603 form a single primary gas fuel circuit.

Referring to FIG. 3, the flange assembly 610 may include a primary gas fitting 621 affixed to the flange 611 and a gas inlet passage 614 in flow communication with the primary gas fitting 621. The gas inlet passage 614 may extend through the flange 611 and into the distribution block 612. Referring to FIG. 4, the distribution block 612 includes a first primary passage 615, a second primary passage 616, and a secondary passage 617. In the embodiment illustrated, the first primary passage 615, the second primary passage 616, and the secondary passage 617 are all in flow communication with the gas inlet passage 614. As illustrated in FIG. 4, the first primary passage 615, the second primary passage 616, and the secondary passage 617 may connect to the gas inlet passage 614, and may be in a parallel flow configuration.

The flange assembly 610 may also include a first primary tube port 638, a second primary tube port 639, and a secondary tube port 619. The first primary tube 601 may connect to the distribution block 612 at the first primary tube port 638, may be in flow communication with the first primary passage 615 and may fluidly connect the first primary passage 615 to the first primary tube 601. The second primary tube 602 may connect to the distribution block 612 at the second primary tube port 639, may be in flow communication with the second primary passage 616, and may fluidly connect the second primary passage 616 to the second primary tube 602. The secondary tube 603 may connect to the distribution block 612 at the secondary tube port 619, may be in flow communication with the secondary passage 617, and may fluidly connect the secondary passage 617 to the secondary tube 603.

Referring to FIGS. 3 and 4, the first primary passage 615, the second primary passage 616, and the secondary passage 617 may all intersect the gas inlet passage 614 at the same location. In the embodiment illustrated, the first primary passage 615, the second primary passage 616, and the secondary passage 617 are cross-drilled. The first primary passage 615 is drilled at an angle from the side of the distribution block 612, intersects with the gas inlet passage 614 and extends to the first primary tube port 638. The second primary passage 616 is drilled at an angle from the opposite side of the distribution block 612, intersects with the gas inlet passage 614 and the first primary passage 615 and extends to the second primary tube port 639. The secondary passage 617 is drilled up from the bottom of the distribution block 612, intersects with the gas inlet passage 614, the first primary passage 615 and the second primary passage 616, and extends to the secondary tube port 619. The flange assembly 610 may include a plug 618 at the end of each passage distal to its respective tube port.

In some embodiments, the first primary passage 615, the second primary passage 616, and the secondary passage 617 may all start at the gas inlet passage 614 and extend to their respective tube ports. For example, the first primary passage 615, the second primary passage 616, and the secondary passage 617 may be formed concurrently with the distribution block 612 during an additive manufacturing process and may not require cross-drilling.

The flange assembly 610 may also include a stem cavity 622. The stem cavity 622 may extend through the flange 611 and may also extend through the distribution block 612. In the embodiment illustrated, the distribution block 612 is shaped to extend around the tube stem 604.

The tube stem 604 may extend through the flange assembly 610 and into the injector head 630. The tube stem 604 may include a main liquid tube cavity 605, a pilot liquid tube cavity 606, and a pilot gas passage 625 extending therethrough.

The fuel injector 600 may also include a main liquid fitting 627, a pilot liquid fitting 628, and a pilot gas fitting 691 connected to the tube stem 604 distal to the injector head 630. In embodiments, the fuel injector 600 includes a main liquid tube 607 extending through the main liquid tube cavity 605 and a pilot liquid tube 608 extending through the pilot liquid tube cavity 606. The main liquid tube 607 is in flow communication with the main liquid fitting 627 and the pilot liquid tube 608 is in flow communication with the pilot liquid fitting 628. In the embodiment illustrated, the fuel injector 600 includes standoffs for the pilot liquid tube 608 to maintain the spacing between the pilot liquid tube 608 and the tube stem 604 at pilot liquid tube cavity 606.

Figure 5:
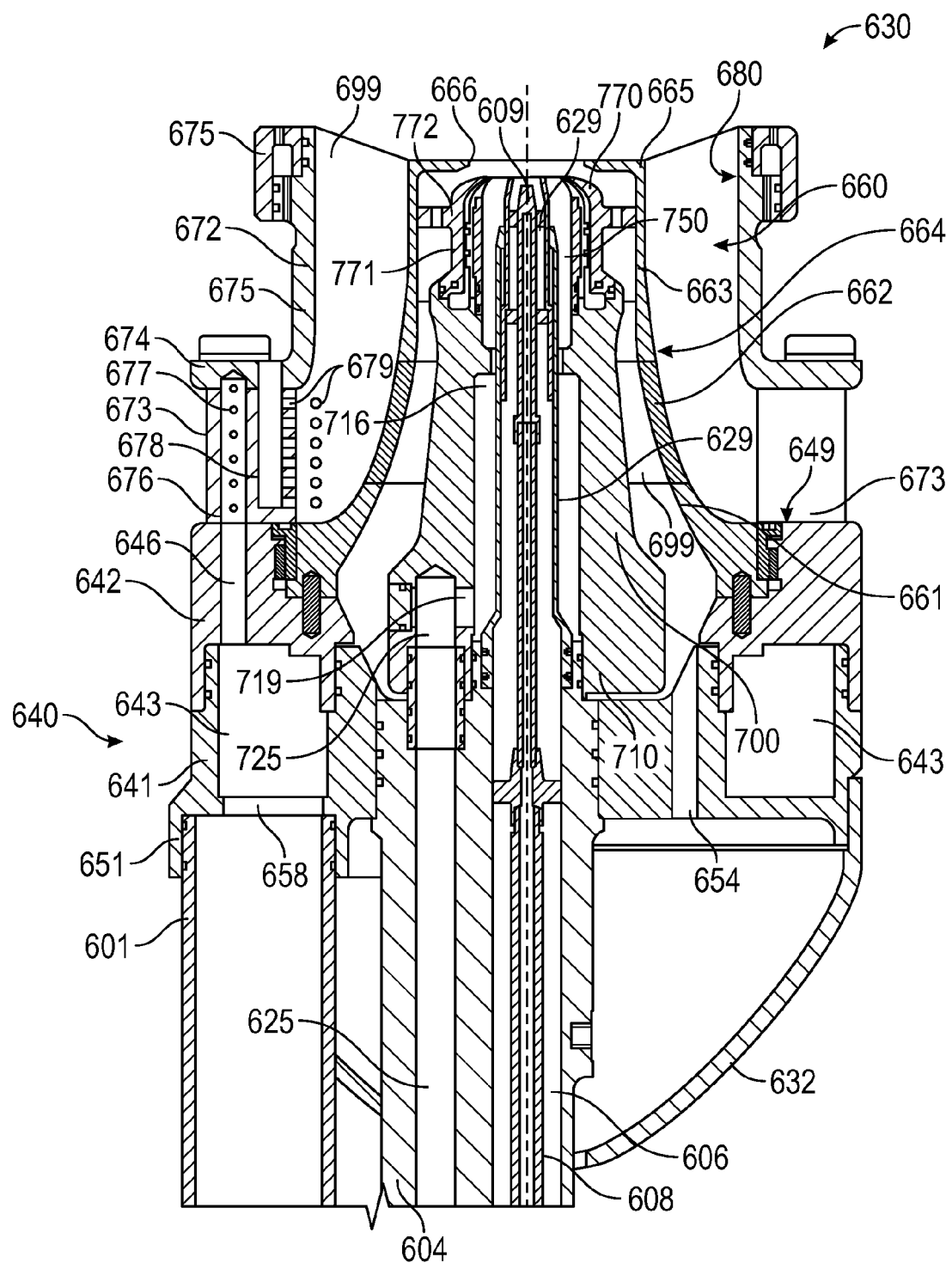
FIG. 5 is a cross-sectional view of the injector head of FIGS. 2 and 3.

FIG. 5 is a cross-sectional view of the injector head 630 of FIGS. 2 and 3. The injector head 630 may include an assembly axis 797. All references to radial, axial, and circumferential directions and measures of the injector head 630 and the elements of the injector head 630 refer to the assembly axis 797, and terms such as "inner" and "outer" generally indicate a lesser or greater radial distance from the assembly axis 797. The center of the flange 611 may be offset from the assembly axis 797.

Referring to FIGS. 3 and 5, the injector head 630 may include an injector body 640, an outer cap 632, an outer premix barrel 670, an inner premix tube 660, a premix barrel cap 681, pilot tube shield 629, and a center body assembly 700. The injector body 640 may include an aft portion 641 and a forward portion 642.

The aft portion 641 may have a cylindrical shape and may be a hollow cylinder with a 'C', 'U', or 'J' shaped cross-section revolved about assembly axis 797. The forward portion 642 may also have a cylindrical shaped base and may also be a hollow cylinder. The forward portion 642 may also include a coaxial hollow cylinder portion extending in the aft direction from the base. The diameter of the hollow cylinder portion may be larger than the diameter of the base forming a counterbore for the inner premix tube 660. The forward portion 642 may also include a counterbore for the lock ring 634 that may be used to secure the inner premix tube 660 to the forward portion 642. The forward portion 642 may also include an injector body face 649. The injector body face 649 may be an annulus and may face in the forward axial direction, opposite the aft portion 641. The forward portion 642 and aft portion 641 may be metallurgically bonded, such as by brazing or welding.

The first primary fuel transfer fitting 651, the second primary fuel transfer fitting 652, and the secondary fuel transfer fitting 653 may be integral to the aft portion and may be located on the opposite axial side of the aft portion 641 relative to the forward portion 642.

The injector head 630 also includes a primary gas gallery 643, primary gallery inlets 658, a secondary gallery inlet 659, and body primary gas passages 646. The aft portion 641 and the forward portion 642 may be joined together to form the primary gas gallery 643. The primary gas gallery 643 may be an annular cavity extending around the assembly axis 797. In embodiments, the 'C', 'U', or 'J' cross-sectional shape of the aft portion 641 revolved about assembly axis 797 may form the primary gas gallery 643 when affixed to the forward portion 642.

The injector head 630 may include a primary gallery inlet 658 adjacent each primary fuel transfer fitting, such as the first primary fuel transfer fitting 651 and the second primary fuel transfer fitting 652. The primary gallery inlet 658 may be an opening extending through an aft end of the aft portion 641 that extends to the primary gas gallery 643 so that the primary gas tube connected to the adjacent primary fuel transfer fitting 651 is in flow communication with the primary gas gallery 643. In the embodiment illustrated, the secondary gallery inlet 659 is an opening extending through an aft end of the aft portion 641 that extends to the primary gas gallery 643 so that the secondary tube 603 is in flow communication with the primary gas gallery 643.

The body primary gas passages 646 may extend axially through the forward portion from the primary gas gallery 643 to provide a path for the primary gas fuel to the outer premix barrel 670. In the embodiments illustrated in FIGS. 3-5, the main gas fuel is provided to the outer premix barrel 670 within a single main gas fuel circuit. The main gas fuel circuit includes the primary gas fitting 621, the gas inlet passage 614, the first primary passage 615, the second primary passage 616, the secondary passage 617, the first primary tube 601, the second primary tube 602, the secondary tube 603, the primary gas gallery 643, and the body primary gas passages 646.

The injector head may also include a head stem cavity 650 a center body opening 655, and feed air passages 654. The head stem cavity 650 may extend through the aft portion 641 and may be the hollow portion of the hollow cylinder shape of the aft portion 641. The center body opening 655 may be coaxial to the forward portion 642 and may extend through the base of the forward portion 642 in the axial direction. The feed air passages 654 may also extend through the base of the forward portion 642 in the axial direction. The feed air passages 654 may be located radially outward from the assembly axis 797 and the center body opening 655, and may be located radially inward from an inner surface of the hollow cylinder portion of the forward portion 642.

The outer cap 632 may be a dome shaped cap that attaches to the injector body 640 at the radially outer surface of the aft portion 641. The outer cap 632 may include multiple holes and passageways for one or more of the fuel tubes 690 and for compressor discharge air to enter the fuel injector 600.

The outer premix barrel 670 joined to the injector body 640 and located radially outward from the inner premix tube 660. The outer premix barrel 670 may include a barrel 671, a barrel end 672, and a premix tube outer surface 680. The barrel 671 may include a body portion 674, a barrel portion 675, vanes 673, vane primary gas passages 676, primary gas outlets 677, vent air passages 678, and vent air outlets 679. The body portion 674 may have an annular disk shape. The barrel portion 675 may extend axially aft from body portion 674. In the embodiment shown, the barrel portion 675 extends from the aft and radially inner portion of the body portion 674. The barrel portion 675 may have a hollow cylinder or cylindrical tube shape. The hollow cylinder or cylindrical tube shape may be tapered or have a tapered inner surface.

The vanes 673 may extend axially forward from body portion 674. The vanes 673 may be wedge shaped and may have the tip of the wedge truncated or removed. The vanes 673 may include other shapes configured to direct and swirl air into a premix tube 669.

A vane primary gas passage 676 may extend axially into each vane 673. Each vane primary gas passage 676 is aligned with and in flow communication with a body primary gas passage 646. The primary gas outlets 677 extend from a vane primary gas passage 676 and through the vanes 673. In the embodiment illustrated, the primary gas outlets 677 extend transverse to the vane primary gas passages 676 so that the primary gas fuel will exit from the primary gas outlets 677 between adjacent vanes 673 in a tangential direction relative to the assembly axis 797 and into the premix passage 669. In the embodiment illustrated, the vane primary gas passages 676 and the primary gas outlets 677 are part of the main gas fuel circuit.

A vent air passage 678 may also extend axially into each vane 673 and may be located adjacent a vane primary gas passage 676. The vent air outlets 679 extend from the vent air passages 678 through vanes 673 and may exit the vanes 673 at the narrow end of the wedge shape to prevent lower pressure pockets from forming at the end of the vanes 673.

The barrel end 672 may be metallurgically joined to the barrel 671 at the aft end of the barrel portion 675, such as welding or brazing. The barrel end 672 may have a hollow cylinder or cylindrical tube shape similar to the shape of the barrel portion 675. The premix barrel cap 681 may be metallurgically joined, such as by welding or brazing, to the aft end of the barrel end 672 at the outer surface of the barrel end 672. The premix barrel cap 681 may have a 'C', 'U', or 'J' shaped cross-section that is revolved about assembly axis 797. The premix barrel cap 681 may form an air pocket or channel with the barrel end 672.

The premix tube outer surface 680 may include the radially inner cylindrical surfaces of the barrel 671 and the barrel end 672. When installed in the injector head 630, the premix tube outer surface 680 may be located radially outward from the inner premix tube 660.

Referring to FIG. 2, the outer premix barrel 670 may be secured to the injector body 640 with fasteners 635. The vanes 673 may contact the injector body face 649 when the outer premix barrel 670 is joined to the injector body 640.

Referring again to FIGS. 3 and 5, the inner premix tube 660 may be joined to the injector body 640 and may include a transition end 661, a middle tube 662, a tip end 663, a tip face 665, and a premix tube inner surface 664. In the embodiment illustrated in FIG. 3, the transition end 661 is a hyperbolic funnel that initiates a transition from the radial direction to the axial direction relative to the assembly axis 797.

The middle tube 662 may be metallurgically joined to the aft end of the transition end 661, such as by welding or brazing. In the embodiment shown, the middle tube 662 continues the hyperbolic funnel shape of the transition end 661. In other embodiments, middle tube 662 may be a conical frustum, a funnel, or formed from a cross-section with curved outer and inner surfaces revolved about the axis of inner premix tube 660.

The tip end 663 may be metallurgically joined to the aft end of the middle tube 662 distal to the transition end 661. The tip face 665 extends radially inward from the tip end 663 and may be integral to the tip end 663. Tip end 663 may have an annular disk shape which forms a tip opening 666.

The premix tube inner surface 664 is at least a portion of the outer surface of the inner premix tube 660. The premix tube inner surface 664 may be a revolved surface about the axis of the inner premix tube 660 that transitions from a radial or an annular ring surface to a circumferential or cylindrical surface. In the embodiment illustrated, the premix tube inner surface 664 is a hyperbolic funnel or a segment of a pseudosphere. In other embodiments, the radial surface may transition to a cylindrical surface with a combination of line segments or curves revolved about the axis of inner premix tube 660.

The premix tube inner surface 664 is spaced apart from the premix tube outer surface 680 forming a premix passage 669 therebetween. The premix passage 669 may be an annular passage. Compressor discharge air may enter the premix passage 669 between the vanes 673 and may mix with the gas fuel exiting the primary gas outlets 677. The premix passage 669 may direct the fuel air mixture into the combustion chamber 390 for combustion.

The pilot liquid tube 608 may include a pilot tube tip 609. The pilot tube tip 609 may be a single atomizer and may be part of the pilot liquid fuel circuit. The pilot tube tip 609 may include a pressure swirl configuration or a plain orifice configuration. The pilot tube shield 629 may include an axial portion located radially inward of the center body assembly 700 and is configured to shroud the pilot tube tip 609.

The center body assembly 700 may be located radially inward of the inner premix tube 660 and of the injector body 640. The center body assembly 700 may also be axially adjacent to the tube stem 604 and may be metallurgically bonded, such as by brazing or welding, to the tube stem 604.

Referring to FIG. 5, the center body assembly 700 may include a center body 710, a sleeve 750, and a swirler 770. The center body 710 may be adjacent the tube stem 604. The sleeve 750 and the swirler 770 may be located at the end of the center body 710 opposite the tube stem 604. The sleeve 750 extends from an end of the center body 710 and is located radially inward from the swirler 770. The swirler 770 also extends from the end of the center body 710. The swirler 770 includes a swirler body 771 and a swirler flange 772. The swirler flange 772 extends radially outward from the swirler body 771 to the tip end 663 of the inner premix tube 660.

The center body 710 includes an aft pilot bore 716, a pilot gas port 725, and a pilot gas inlet 719. The aft pilot bore 716 may be a counterbore that extends coaxially into the center body 710 relative to the assembly axis 797. The pilot gas port 725 is in flow communication with the pilot gas passage 625 and may extend axially into the center body 710 radially adjacent to the aft pilot bore 716. The pilot gas inlet 719 connects the pilot gas port 725 to the aft pilot bore 716, and may extend radially between the pilot gas port 725 to the aft pilot bore 716. The pilot gas fitting 691, the pilot gas passage 625, the pilot gas port 725, and the pilot gas inlet 719 form a pilot gas fuel circuit for providing pilot gas fuel to the aft pilot bore 716 for directing the pilot gas fuel out of the tip opening 666 for combustion.

Referring to FIG. 3, the center body 710 also includes a liquid tube port 722 and a primary liquid passage 721. The liquid tube port 722 is in flow communication with the main liquid tube 607. The liquid tube port 722 may extend axially into the center body 710. The primary liquid passage 721 extends from the liquid tube port 722 through the center body 710 to deliver the main liquid fuel to the liquid gallery 774 shown in FIGS. 9-11. The main liquid fitting 627, the main liquid tube 607, the liquid tube port 722, and the primary liquid passage 721 form a main liquid fuel circuit for providing fuel from the main liquid fitting 627 to the liquid gallery 774 so that the liquid fuel can be prefilmed prior to directing the liquid fuel out of the tip opening 666 for combustion.

Figure 6:
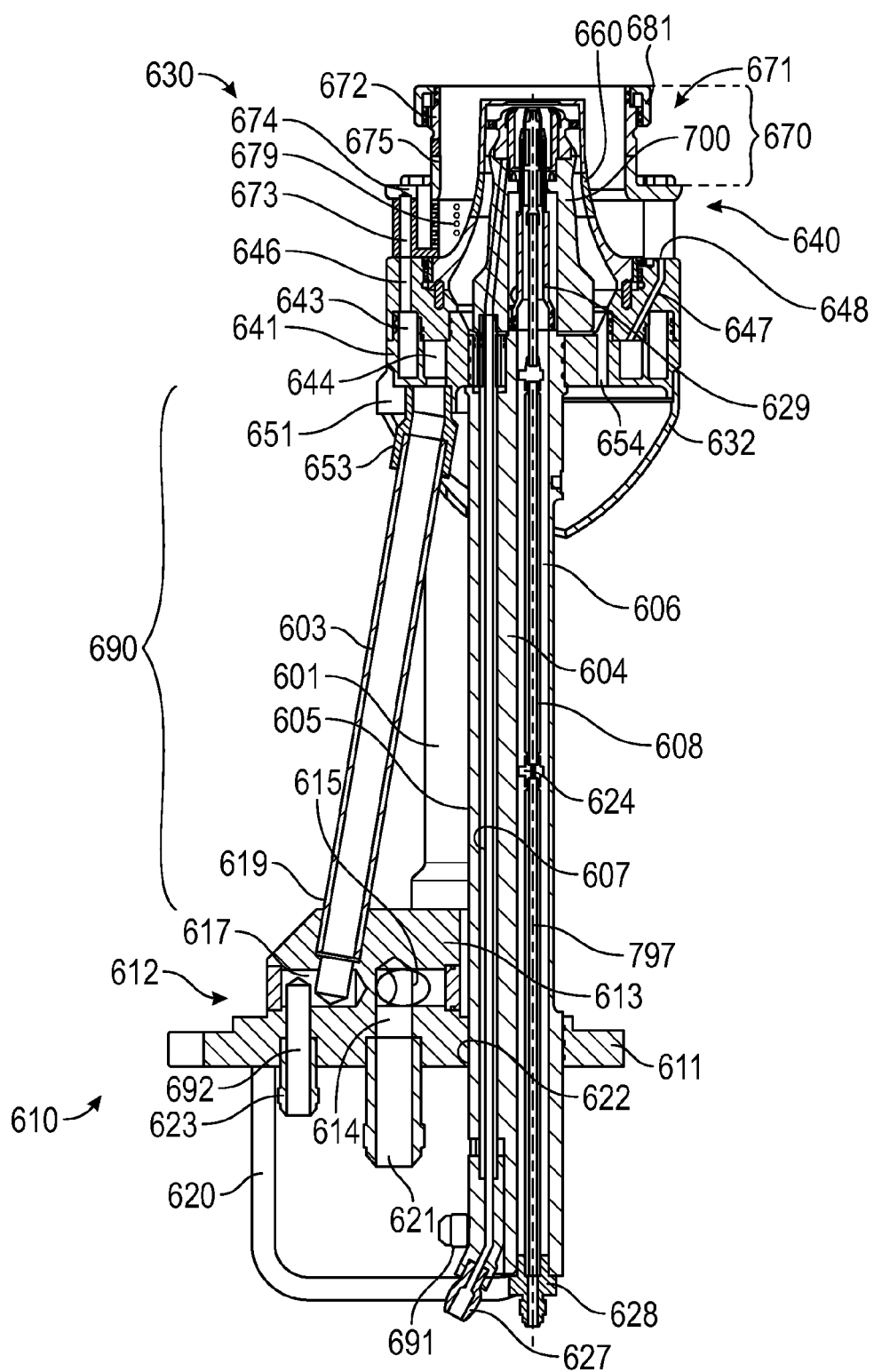
FIG. 6 is a cross-sectional view of an alternate embodiment of the Fuel injector of FIG. 2.

FIG. 6 is a cross-sectional view of an alternate embodiment of the fuel injector of FIG. 2. In the embodiment illustrated in FIG. 6, the first primary tube 601 and the second primary tube 602 form part of a primary gas fuel circuit, while the secondary tube 603 forms part of a secondary gas fuel circuit.

The primary gas fitting 621 is in flow communication with the first primary tube 601 and the second primary tube 602. The primary gas fitting 621 is not in flow communication with the secondary tube 603. In the embodiment illustrated in FIG. 6, the flange assembly 610 includes a secondary gas fitting 623 that is in flow communication with the secondary passage 617 and the secondary tube 603. The flange assembly 610 may include a secondary gas inlet passage 692 that fluidly connects the secondary gas fitting 623 to the secondary passage 617. The distribution block 612 may be configured to isolate the secondary gas fitting 623 and the secondary tube 603 from the primary gas fitting 621, the first primary tube 601, and the second primary tube 602.

The stem cavity 622, tube stem 604, main liquid fitting 627, pilot liquid fitting 628, pilot gas fitting 691, and their related features may be the same or similar as described above relative to the previous embodiment.

Figure 7:
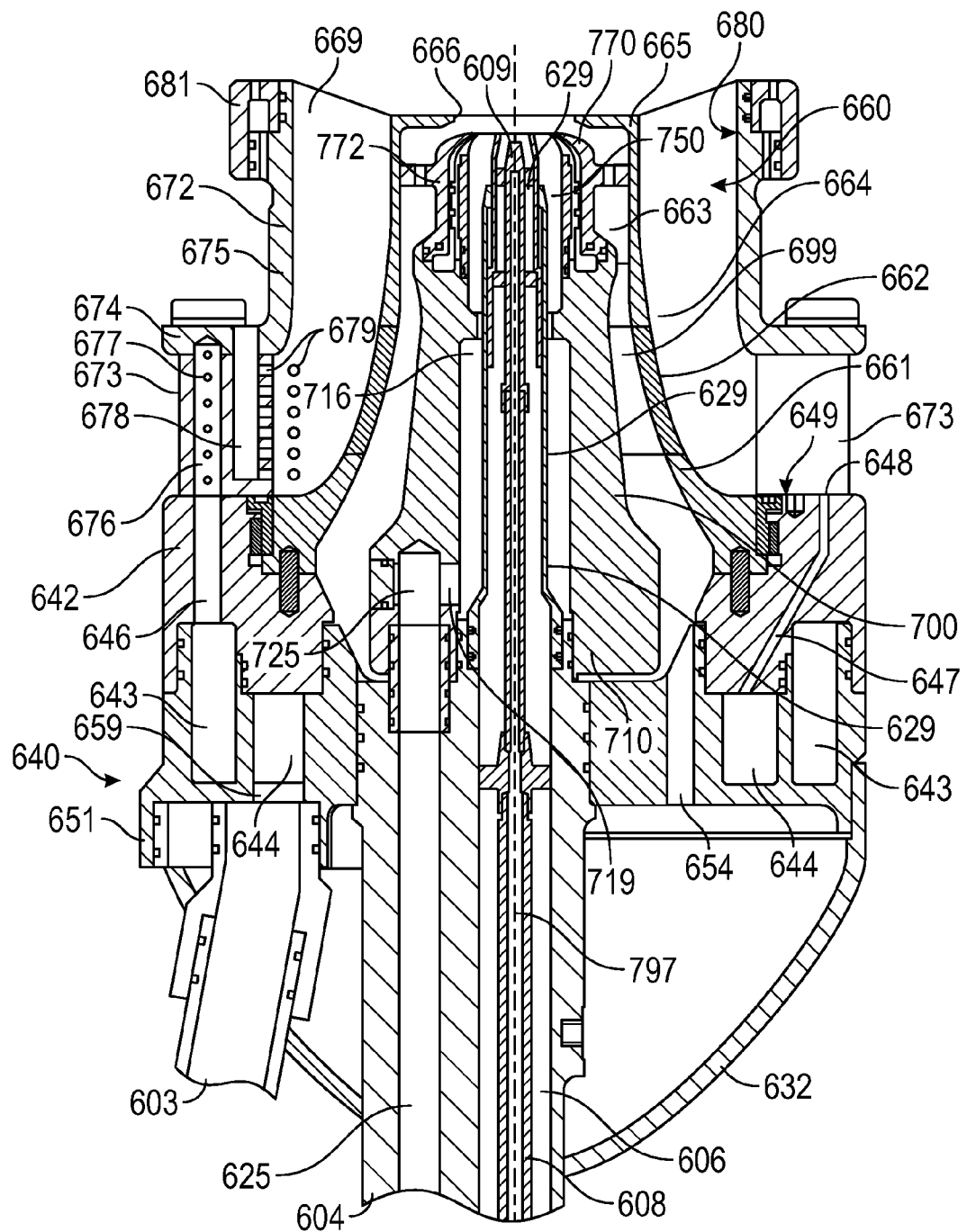
FIG. 7 is a cross-sectional view of the injector head of FIG. 6.
Figure 8:
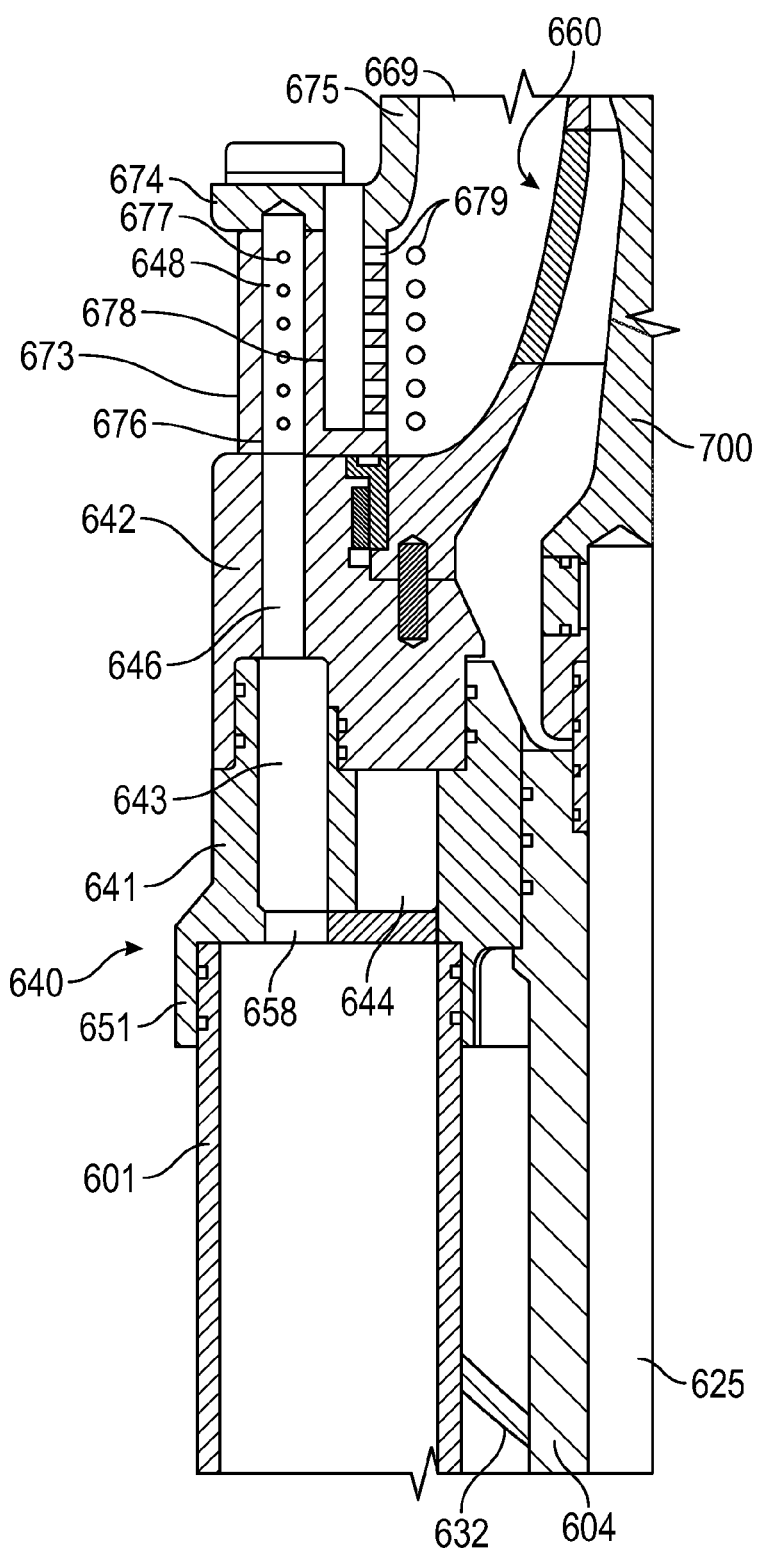
FIG. 8 is a cross-sectional view of a portion of the injector head of FIG. 6

FIG. 7 is a cross-sectional view of the injector head 630 of FIG. 6. FIG. 8 is a cross-sectional view of a portion of the injector head 630 of FIG. 6. Referring to FIGS. 6-8, the injector head 630 in this embodiment includes a primary gas gallery 643 and a secondary gas gallery 644. The primary gas gallery 643 and the secondary gas gallery 644 may be adjacent annular cavities. As shown, the primary gas gallery 643 and the secondary gas gallery 644 may be radially spaced apart with one radially inward of the other.

The embodiment of FIGS. 6-8 also includes primary gallery inlets 658 (shown in FIG. 8), body primary gas passages 646, vane primary gas passages 676, and primary gas outlets 677. A primary gallery inlet 658 is located between the first primary tube 601 and the primary gas gallery 643 and between the second primary tube 602 and the primary gas gallery 643. The body primary gas passages 646, vane primary gas passages 676, and primary gas outlets 677 may be the same or similar to those described in conjunction with the previous embodiment.

The primary gas fuel circuit includes the primary gas fitting 621, the first primary tube 601, the second primary tube 602, the primary gas gallery 643, the body primary gas passages 646, vane primary gas passages 676, and primary gas outlets 677. The first primary tube 601 and the second primary tube 602 are each in flow communication with the primary gas fitting 621 and the primary gas gallery 643. The primary gas gallery 643 is in flow communication with the body primary gas passages 646, vane primary gas passages 676, and primary gas outlets 677. The primary gas fuel circuit is configured to deliver main gas fuel from the primary gas fitting 621 to the premix passage 669 via the primary gas outlets 677.

The embodiment of FIGS. 6-8 also includes a secondary gallery inlet 659 (shown in FIGS. 6 and 7), secondary gas outlets 648, and secondary gas passages 647. The secondary gallery inlet 659 is located between the secondary tube 603 and the secondary gas gallery 644. Each secondary gas outlet 648 may be located at the injector body face 649 between adjacent vanes 673. The secondary gas outlets 648 may be configured to direct main gas fuel between the vanes 673 in an axial direction. Each secondary gas outlet 648 may extend into the forward portion 642 from the injector body face 649. The secondary gas outlets 648 may be evenly clocked in the circumferential direction so that a secondary gas outlet 648 is located between each set of adjacent vanes 673.

Each secondary gas passage 647 extends through the forward portion 642 from a secondary gas outlet 648 to the secondary gas gallery 644 to connect the secondary gas outlet 648 to the secondary gas gallery 644. In embodiments, each secondary gas passage 647 extends in the axially aft direction and in the radially outer direction from the secondary gas gallery 644 to the secondary gas outlets 648

The secondary gas fuel circuit includes the secondary gas fitting 623, the secondary tube 603, the secondary gas gallery 644, the secondary gas passages 647 and the secondary gas outlets 648. The secondary gas fuel circuit is configured to deliver main gas fuel from the secondary gas fitting 623 to the premix passage 669 via the secondary gas outlets 648.

Figure 9:
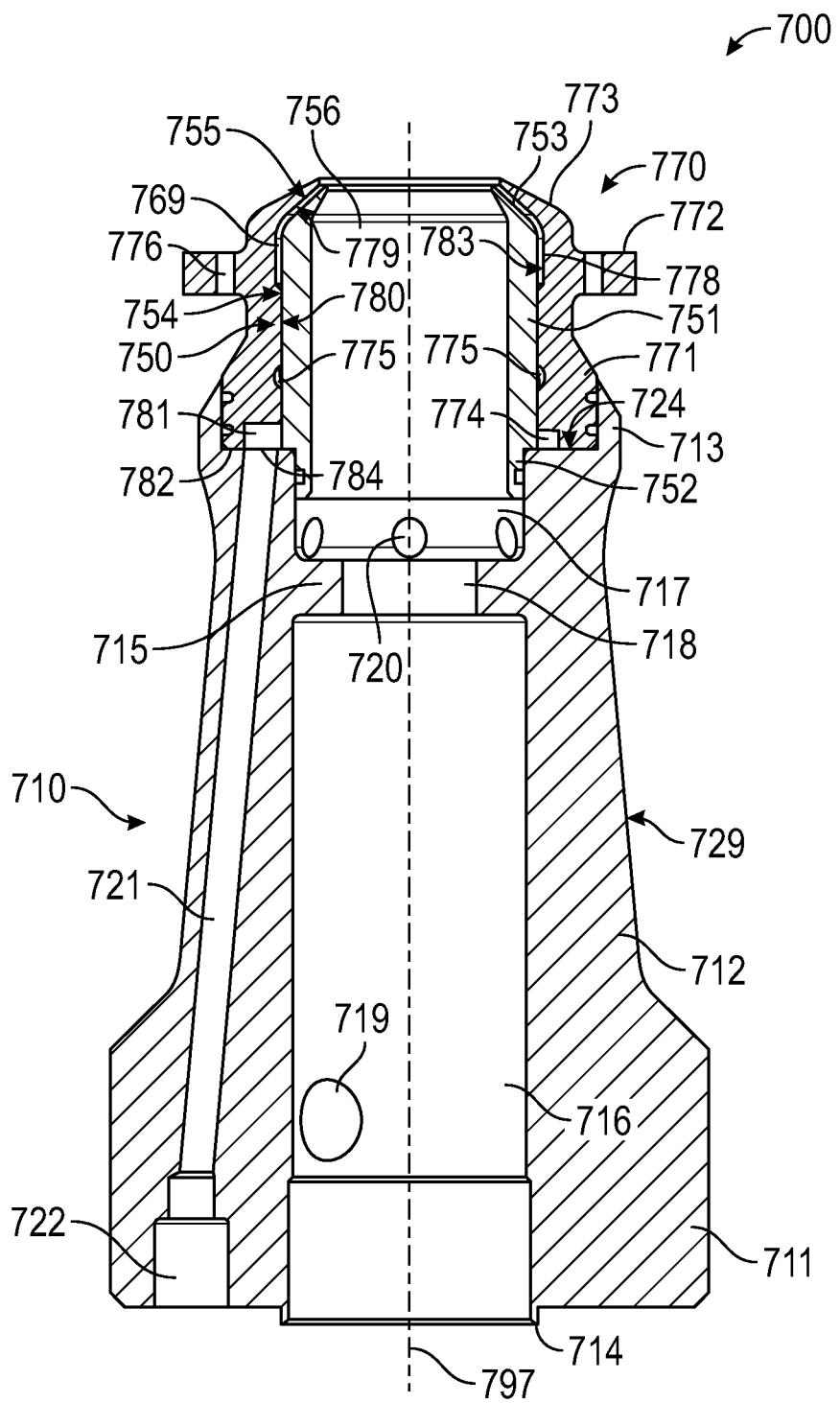
FIG. 9 is a cross-sectional view of the center body assembly of FIGS. 2-8.
Figure 10:
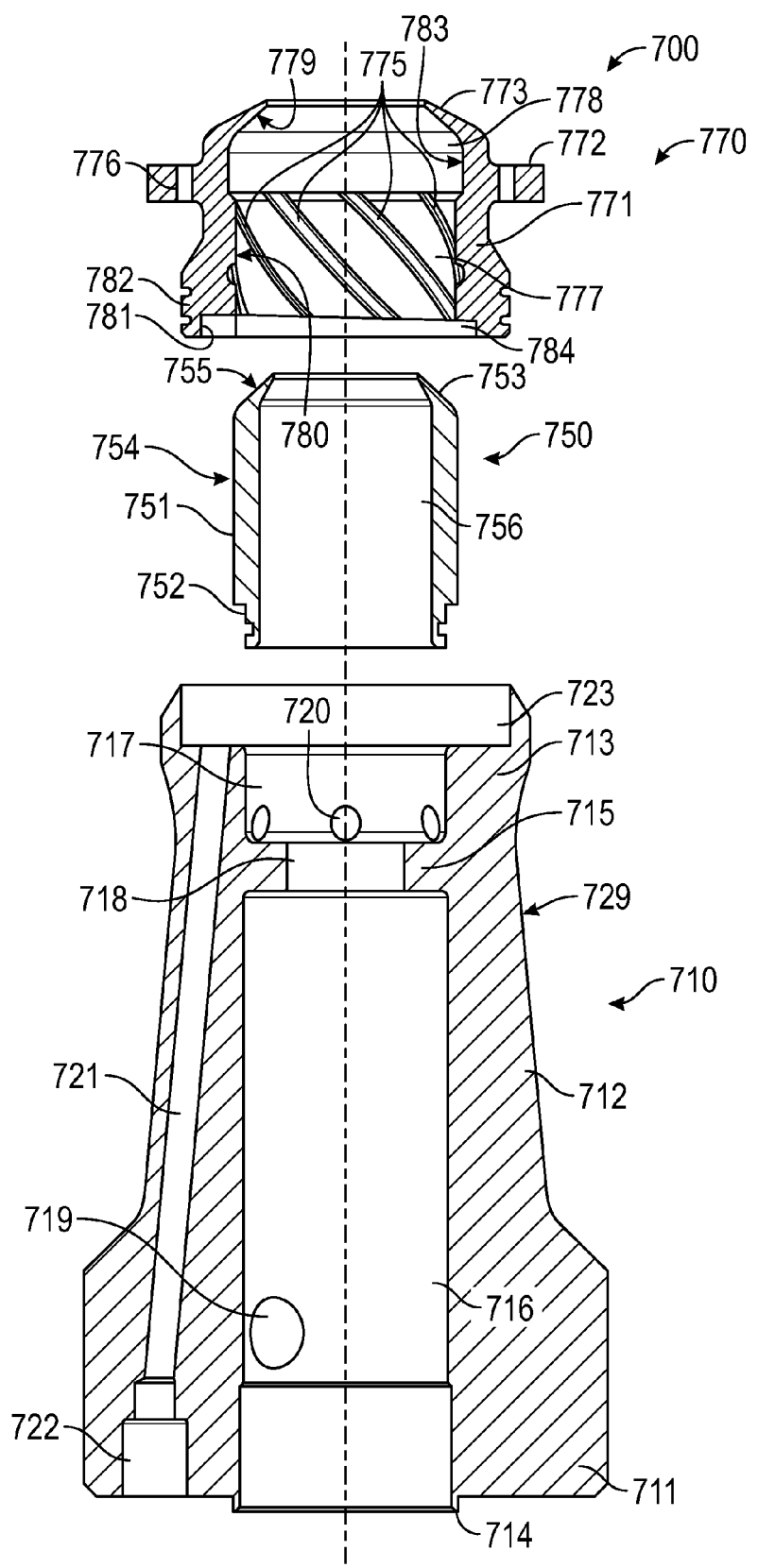
FIG. 10 is an exploded cross-sectional view of the center body assembly of FIG. 9.

FIG. 9 is a cross-sectional view of the center body assembly 700 of FIGS. 2-8. FIG. 10 is an exploded cross-sectional view of the center body assembly 700 of FIG. 9. Referring to FIGS. 9 and 10, the center body 710 may include a base end 711, a middle portion 712, a swirl end 713, and a stem connector 714. The base end 711 may include a cylindrical shape and may be flanged relative to the middle portion 712. The middle portion 712 extends between the base end 711 and the swirl end 713 and may taper from the base end 711 to the swirl end 713. The swirl end 713 is distal to the base end 711 and may be flanged relative to the middle portion 712. The stem connector 714 may include a hollow cylinder shape and may extend from the base end 711 in the direction opposite the swirl end 713. The stem connector 714 may be used to join the center body 710 to the tube stem 604. In some embodiments, the stem connector 714 may also include a counter bore that extends into the base end 711 and receives a portion of the tube stem 604.

The center body 710 also includes the aft pilot bore 716, a swirler port 723, a forward pilot bore 717, an inner flange 715, and a pilot tube bore 718. The aft pilot bore 716 may extend from the base end 711 and into the middle portion 712. The aft pilot bore 716 may extend from the stem connector 714 to the inner flange 715. The swirler port 723 may extend into the swirl end 713. The swirler port 723 may be a counter bore that is configured to receive the swirler 770. The forward pilot bore 717 may extend from the swirler port 723 to the inner flange 715. The swirler port 723 may include a swirler port surface 724 that is the bottom surface of the swirler port 723. The swirler port surface 724 may include the shape of an annulus.

The inner flange 715 may extend radially inward from the middle portion 712. The inner flange 715 may be a hollow cylinder and may form the pilot tube bore 718. The pilot tube bore 718 may connect the aft pilot bore 716 to the forward pilot bore 717. The center body 710 may also include pilot air inlets 720 extending through the middle portion 712 to the forward pilot bore 717. The pilot air inlets 720 may allow compressor discharge air to enter into the forward pilot bore 717 and mix with the pilot gas fuel prior to being directed into the combustion chamber 390.

The pilot gas inlet 719, the aft pilot bore 716, the pilot tube bore 718, and the forward pilot bore 717 may also form part of the pilot gas fuel circuit.

The sleeve 750 may include a sleeve body 751, a sleeve base 752, and a sleeve tip 753. The sleeve body 751 may include a hollow cylinder shape and may form a sleeve bore 756 there within. The sleeve bore 756 may direct the pilot gas fuel and air mixture from the forward pilot bore 717 to the combustion chamber 390 through the tip opening 666. The sleeve body 751 may include a sleeve body surface 754. The sleeve body surface 754 may be a right circular cylinder and may be the outer surface of the sleeve body 751.

The sleeve base 752 may extend axially from the sleeve body 751. The sleeve base 752 may include a hollow cylinder shape and may have an outer diameter that is smaller than the outer diameter of the sleeve base 752. The sleeve base 752 may be sized to fit within the forward pilot bore 717 so that the sleeve body 751 may abut the swirl end 713 within the swirler port 723 adjacent to the forward pilot bore 717.

The sleeve tip 753 may extend from the sleeve body 751 in the direction opposite the sleeve base 752. The sleeve tip 753 may include a funnel shape, such as a frustum of a hollow cone. The sleeve tip 753 may taper such that the thickness of the sleeve tip 753 narrows as the funnel narrows. The sleeve tip 753 may include a sleeve prefilm surface 755. The sleeve prefilm surface 755 may be the outer surface of the sleeve tip 753. The sleeve prefilm surface 755 may include a frusto-conical shape.

The swirler 770 may include a swirler body 771 and a swirler flange 772 as previously described. The swirler body 771 may be solid of revolution that is revolved about the assembly axis 797.

The swirler 770 may also include a swirler base 782, a swirler tip 773, a liquid gallery slot 784, a swirler bore 777, swirler bore surface 780, a prefilm bore 778, and swirl slots 775. The swirler base 782 may be adjacent the swirler body 771 and may be sized relative to the swirler port 723. The swirler 770 and the center body 710 may be joined at the swirler base 782 and the swirler port 723. The swirler body 771 may taper from the swirler base 782 to the swirler flange 772. The swirler base 782 is located in the swirler port 723 and may abut the swirler port surface 724.

The swirler tip 773 extends from the swirler body 771 distal to and opposite the swirler base 782. The swirler tip 773 may include a funnel shape, such as a frustum of a hollow cone. The swirler tip 773 may taper such that the thickness of the swirler tip 773 narrows as the funnel narrows. The swirler tip 773 may include a swirler prefilm surface 779. The swirler prefilm surface 779 may be the inner surface of the swirler tip 773. The swirler prefilm surface 779 may include a frusto-conical shape. When assembled, the swirler prefilm surface 779 may be spaced apart from the sleeve prefilm surface 755.

The swirler bore 777 may extend from the swirler base 782 and into the swirler body 771. The swirler bore 777 may include a cylindrical shape. The swirler bore surface 780 may be the surface of the swirler bore 777. The swirler bore surface 780 may include a cylindrical shape, such as a right circular cylinder. When assembled, the swirler bore surface 780 adjoins the sleeve body surface 754. The sleeve 750 and the swirler 770 may be assembled to create a seal there between, such as being assembled with an interference fit where the swirler bore surface 780 has a smaller diameter than that of the sleeve body surface 754.

The prefilm bore 778 may be adjacent the swirler bore 777 and may include a prefilm bore surface 783. The prefilm bore surface 783 may include a diameter that is larger than the swirler bore surface 780. When assembled, the prefilm bore surface 783 is offset from the sleeve body surface 754 forming an annulus there between. This annulus may form a forward portion of the prefilm passage 769. The prefilm passage 769 may extend axially before being turned inward toward the assembly axis 797. When being turned inward, the prefilm passage 769 may extend both in the axial aft direction and in the radially inward direction relative to the assembly axis 797.

Figure 11:
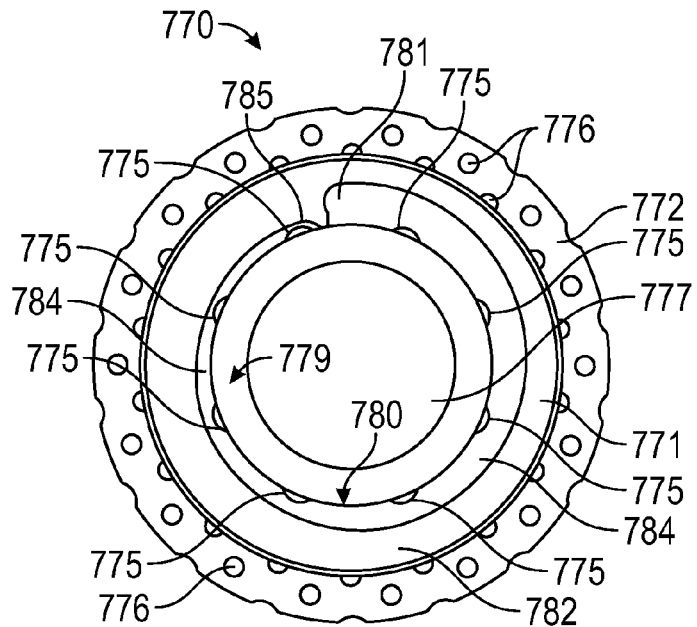
FIG. 11 is a bottom view of the swirler of FIGS. 10 and 11.

The liquid gallery slot 784 is located in the swirler base 782. FIG. 11 is a bottom view of the swirler 770 of FIGS. 10 and 11. Referring to FIGS. 9-11, the liquid gallery slot 784 may be a circumferential slot that extends around a majority of the swirler base 782 adjacent to the swirler bore 777. The liquid gallery slot 784 may extend circumferentially from a gallery inlet end 781 to a gallery discharge end 785. The gallery inlet end 781 and the gallery discharge end 785 may be adjacent without touching, i.e. slightly spaced apart with material there between.

The liquid gallery slot 784 may taper from the gallery inlet end 781 to the gallery discharge end 785 with the cross-sectional area of the liquid gallery slot 784 reducing from the gallery inlet end 781 to the gallery discharge end 785. The liquid gallery slot 784 may include a constant taper from the gallery inlet end 781 to the gallery discharge end 785 or may taper in sections. The liquid gallery slot 784 may taper in the radial direction as illustrated in FIG. 11 and may taper in the axial direction as illustrated in FIG. 10.

Referring to FIG. 9, the liquid gallery slot 784 may adjoin the swirler bore surface 780 and the swirler port surface 724 when the swirler 770 is assembled to the center body 710. The liquid gallery slot 784, the swirler bore surface 780, and the swirler port surface 724 may form a liquid gallery 774 for distributing the main liquid fuel from the primary liquid passage 721. The gallery inlet end 781 may adjoin and be in flow communication with the primary liquid passage 721.

Referring to FIG. 10, the swirl slots 775 extend from the liquid gallery slot 784 to the prefilm bore 778 along the swirler bore surface 780. The swirl slots 775 may extend into the swirler body 771 from the swirler bore surface 780. The swirl slots 775 may extend in both the axial direction and the circumferential direction, such as in a helical pattern, to swirl the main liquid fuel by adding a tangential component to the direction that the main liquid fuel is traveling.

Referring to FIG. 9, the swirl slots 775 adjoin the sleeve body surface 754 forming swirling passages for the main liquid fuel. The fit between the sleeve body 751 and the swirler body 771 may be formed to seal the swirl slots 775 to prevent main liquid fuel from leaking from the swirl slots 775.

The number of swirl slots 775 may be selected to ensure that the main liquid fuel exiting the swirl slots 775 into the prefilm passage 769 form into a film prior to exiting the prefilm passage 769. In embodiments, the swirler 770 may include six to ten swirl slots 775 to ensure that the main liquid fuel forms a film in the prefilm passage 769. In the embodiment illustrated in FIGS. 9-11, the swirler 770 includes eight swirl slots 775.

The main liquid fuel circuit may also include the liquid gallery 774, the swirl slots 775, and the prefilm passage 769.

While the embodiments of the center body assembly 700 include the center body 710, the sleeve 750, and the swirler 770 as separate components that are joined together, such as by metallurgical bonding, some embodiments include two or more of the center body assembly 700 components as an integral piece. This integral piece may be formed by an additive manufacturing or similar manufacturing process.

The bores, passages, cavities, holes, and other similar elements disclosed herein are formed in one of the flange assembly 610, tube stem 604, or the injector head 630, such as by a casting or machining process. The bores, passages, cavities, holes, and other similar elements are defined by the component through which they extend.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel, such as a liquid fuel or a gas fuel, is added. Air 10 and fuel are injected into the combustion chamber 390 via injector 600 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Fuel passing through a tube in the fuel injector 600 may cause a temperature change within the tube and may cause the tube to expand or contract. In the embodiment disclosed in FIGS. 3-5, the fuel injector 600 is configured to provide a single primary gas fuel circuit that splits a single main gas fuel source into three parallel paths that direct the main gas fuel into the primary gas gallery 643. In the embodiment illustrated, the distribution block 612 splits into a first primary passage 615 that directs fuel into the first primary tube 601, a second primary passage 616 that direct fuel into the second primary tube 602, and a secondary passage 617 that directs fuel into the secondary tube 603.

By splitting the fuel three ways in the distribution block 612, the main gas fuel may be evenly supplied to each tube and may provide similar temperature gradients to each tube resulting in a similar thermal expansion in each tube. Maintaining a similar thermal expansion in each tube may prevent, inter alia, mechanical deformation of one or more of the tubes and may prevent deflection of the injector head 630.

In the embodiment disclosed in FIGS. 6-8, the main gas fuel is supplied by dual main gas fuel circuits, such as a primary gas fuel circuit and a secondary gas fuel circuit. In the embodiment illustrated, the primary gas fuel circuit injects main gas fuel into the premix passage 669 through the vanes 673 and the secondary gas fuel circuit injects main gas fuel into the premix passage 669 through the back plane of the injector body 640 at the injector body face 649.

The dual main gas fuel circuits may minimize the fuel pressure requirements across the operating range of the gas turbine engine and may provide for robust control of the main gas fuel delivery into the premix passage 669 for lean premixed combustion. This robust control may allow emission guarantees to be met for both low calorific value fuels, such as hydrocarbon based low Wobbe Index fuels, and high calorific value fuels, such as natural gas, using the same hardware.

When the gas turbine engine 100 is running on low calorific value gas fuels, such as gas fuels with a Wobbe Index from 450-750, both the primary and secondary main gas fuel circuits may supply fuel to the premix passage 669 over the entire operating range including light off, acceleration to idle, and the entire load range from idle to full load. The pilot gas fuel circuit may also supply gas fuel for combustion over the entire operating range. In embodiments, the percentage of fuel flow supplied through the secondary main gas fuel circuit may remain constant, while the percentage of fuel flow supplied through the primary main gas fuel circuit and through the pilot gas fuel circuit may vary depending on the operating conditions and emissions guarantee requirements.

When the gas turbine engine 100 is running on high calorific value gas fuels, such as gas fuels with a Wobbe Index from 750-1320, the secondary main gas fuel circuit and the pilot gas fuel circuit may provide the gas fuel for lower flow regimes, such as light off, idle, and up to a predetermined percentage of the load. The primary main gas fuel circuit may also provide gas fuel with the secondary main gas fuel circuit and the pilot gas fuel circuit for higher flow fuel regimes, such as from the predetermined percentage to full load. Providing the gas fuel for lower flow regimes through only the secondary main gas fuel circuit and the pilot gas fuel circuit may help control the pressure drop within the secondary main gas fuel circuit at lower fuel flows. Providing the gas fuel through the primary main gas fuel circuit and the secondary main gas fuel circuit at higher flow fuel regimes may help control the pressure drop with the higher fuel flows and may facilitate the appropriate air fuel mixing profile in the premix passage 669 to meet emissions guarantees.

Figure 12:
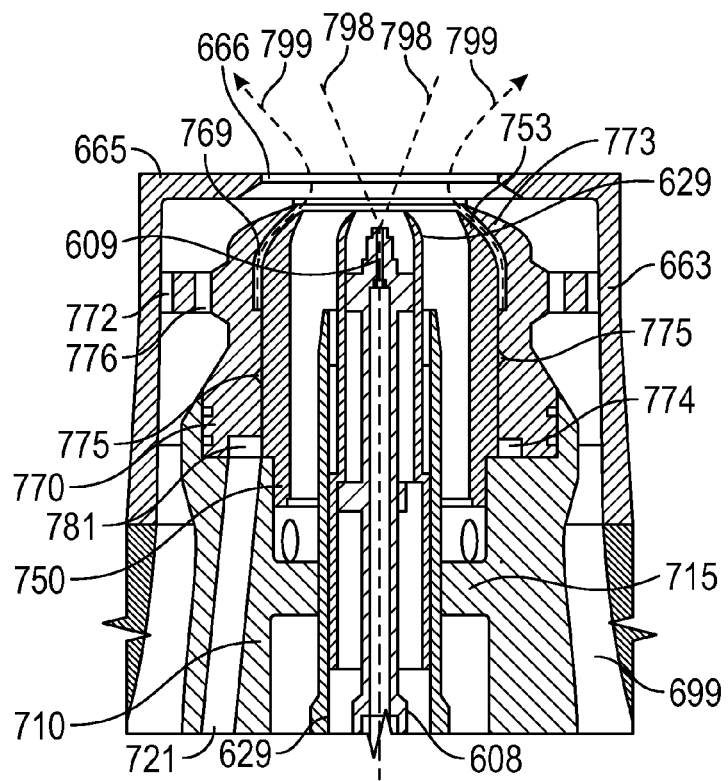
FIG. 12 is a cross-sectional view of a portion of the injector head of the embodiments of FIGS. 2-8.

The center body assembly 700 is configured to inject a film of liquid fuel into the combustion chamber 390. FIG. 12 is a cross-sectional view of a portion of the injector head 630 of the embodiments of FIGS. 2-8. As illustrated by the main reference lines 799 in FIG. 12, the film of liquid fuel may exit the prefilm passage 769 and form a conical shaped film. While the prefilm passage 769 is an annular passage that turns toward the assembly axis 797, the swirl slots 775 impart a circumferential component to the velocity of the liquid fuel which causes the fuel to travel outward from the assembly axis 797 as it exits the prefilm passage 769 to create the conical shape of the liquid film.

The center body assembly 700 may also configured to maintain a near constant fluid velocity around the liquid gallery 774. The cross-sectional area of the liquid gallery slot 784 may reduce in size from the gallery inlet end 781 and the adjacent swirl slot 775 and between adjacent swirl slots 775. This reduction in cross-sectional area may be a constant taper or may vary for each section of the liquid gallery slot 784 between adjacent swirl slots 775. For example, the taper between sections may be configured so that the fluid velocity in the liquid gallery 774 is the same at the inlet of each swirl slot 775. Reducing the cross-sectional area of the liquid gallery slot 784 may help ensure that no sudden steps in the flow path are taken. Reducing the cross-sectional area of the liquid gallery slot 784 may also assist in evenly feeding the liquid fuel to the swirl slots 775 and help in the uniform distribution of liquid fuel within the film.

Reducing the cross-sectional area of the liquid gallery slot 784 may also maintain the velocity of the liquid fuel above a threshold amount to prevent too much heat transfer to the liquid fuel that may lead to coking of the liquid fuel.

Referring again to FIG. 12, the pilot tube tip 609 may inject the pilot liquid fuel into the combustion chamber 390 in a conical pattern as illustrated by pilot reference lines 798. The conical spread of the pilot liquid fuel may be located within the conical spread of the liquid fuel film injected by the center body assembly 700.

The amount of liquid fuel injected by the main liquid fuel circuit via the center body assembly 700 and by the pilot liquid fuel circuit via the pilot tube tip 609 may be optimized for lean direct injection during the various stages operation to minimize smoke during light off and acceleration to idle and to minimize fuel pressure requirements of the system.

Figure 13:
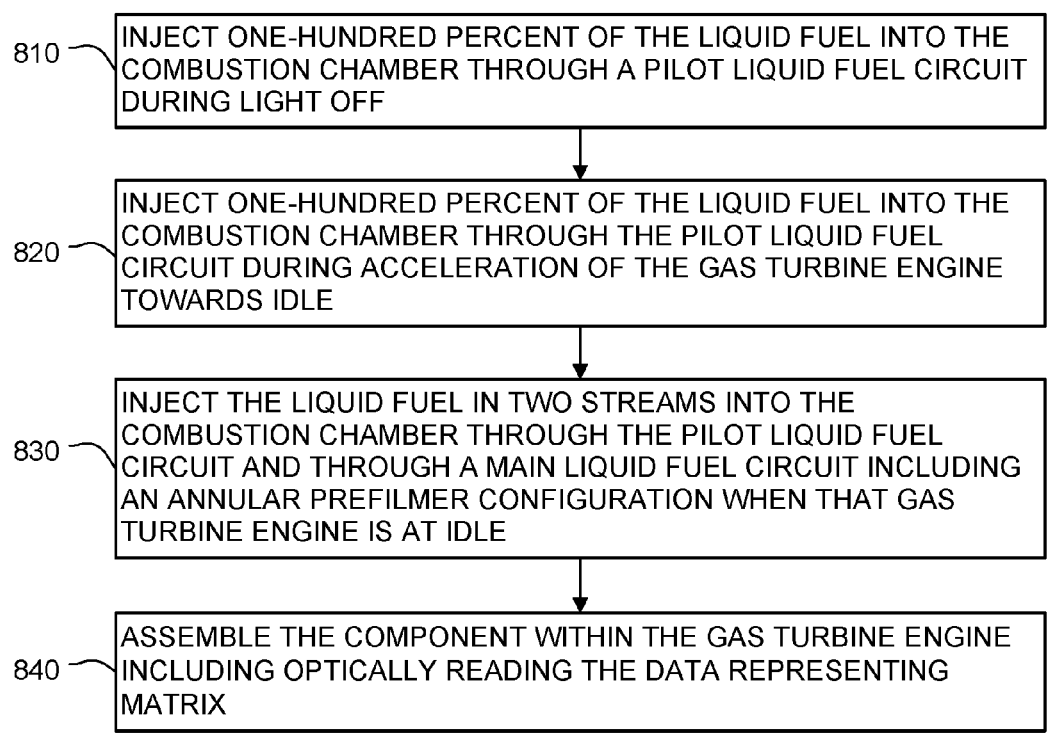
FIG. 13 is a flowchart of a method for lean direct injection of liquid fuel.

FIG. 13 is a flowchart of a method for lean direct injection of liquid fuel. The method includes injecting all, i.e., one-hundred percent, of the liquid fuel into the combustion chamber 390 through a pilot liquid fuel circuit, such as the pilot liquid fuel circuit described herein, during light off at step 810. The method also includes injecting all of the liquid fuel into the combustion chamber 390 through the pilot liquid fuel circuit during acceleration of the gas turbine engine 100 towards idle at step 820. The fuel atomization of the liquid fuel exiting the pilot tube tip 609 during light off and acceleration to idle may minimize smoke generation while providing a reliable light around of the combustion system.

The method further includes injecting the liquid fuel in two streams into the combustion chamber 390 through the pilot liquid fuel circuit and through a main liquid fuel circuit including an annular prefilmer configuration, such as the main liquid fuel circuit that includes the center body assembly 700, when that gas turbine engine 100 is at idle at step 830. Step 830 includes injecting a majority, such as approximately eighty-five percent, of the liquid fuel through the main liquid fuel circuit and the remainder of the liquid fuel through the pilot liquid fuel circuit. In some embodiments, a majority of the liquid fuel is from eighty to ninety percent of the liquid fuel injected. In other embodiments, a majority is from eighty-three to eighty-seven percent of the liquid fuel injected.

The method may include transitioning from injecting all of the liquid fuel through the liquid pilot fuel circuit to injecting the liquid fuel through the two streams with the majority of the liquid fuel being injected through the main liquid fuel circuit during a transition period at or before idle, such as near idle.

The method yet further includes injecting the liquid fuel in the two streams at the same or similar injection levels as step 830 through the operating ranges above idle at step 840. Injecting the liquid fuel through the two streams with a majority of the liquid fuel being injected in an annular film through the main liquid fuel circuit may minimize the fuel pressure requirements of the system while providing the liquid fuel and air mixture needed for lean direct injection.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector, it will be appreciated that the fuel injector in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:
1. A fuel injector for a gas turbine engine, comprising:
a first primary tube;
a second primary tube;
a secondary tube;
a flange;
a distribution block for distributing a main gas fuel to the first primary tube, the second primary tube and the secondary tube, the distribution block extending from the flange, the distribution block defining
  a first primary passage in flow communication with the first primary tube,
  a second primary passage in flow communication with the second primary tube, the second primary passage and the second primary tube being in a first parallel configuration with the first primary passage and the first primary tube, and
  a secondary passage in flow communication with the secondary tube, the secondary passage and the secondary tube being in a second parallel configuration with the first primary passage and the first primary tube, and in a third parallel configuration with the second primary passage and the second primary tube;
a gas inlet passage extending into the distribution block to the first primary passage, the second primary passage and the secondary passage, the gas inlet passage in flow communication with the first primary passage, the second primary passage, and the secondary passage;
a primary gas fitting for supplying the main gas fuel to the distribution block, the primary gas fitting in flow communication with the gas inlet passage;

an injector body defining a primary gas gallery having an annular shape;
a first primary fuel transfer fitting in flow communication with the primary gas gallery and connected to the first primary tube for directing the main gas fuel from the first primary tube into the primary gas gallery;
a second primary fuel transfer fitting in flow communication with the primary gas gallery and connected to the second primary tube for directing the main gas fuel from the second primary tube into the primary gas gallery;
a secondary fuel transfer fitting in flow communication with the primary gas gallery and connected to the secondary tube for directing the main gas fuel from the secondary tube into the primary gas gallery;
wherein the first primary passage, the second primary passage and the secondary passage all intersect at the gas inlet passage; and
wherein the first primary passage, the second primary passage, and the secondary passage are cross-drilled into the distribution block, and wherein the distribution block includes a first plug at a first end of the first primary passage, a second plug at a second end of the second primary passage, and a third plug at a third end of the secondary passage.

2. The fuel injector of claim 1, wherein the distribution block is integral to the flange and extends axially from the flange relative to an assembly axis of the fuel injector.

3. The fuel injector of claim 1, wherein the gas inlet passage is further defined by the flange, and wherein the gas inlet passage extends through the flange and into the distribution block, and the primary gas fitting is affixed to the flange.

4. The fuel injector of claim 1, wherein the secondary tube extends from the distribution block to the injector body to support the injector body and prevent deflection of the injector body.

5. The fuel injector of claim 1, further comprising a tube stem extending through the flange to the injector body, the tube stem defining a pilot gas passage for providing a pilot gas fuel to the injector head.

6. A fuel injector for a gas turbine engine, comprising:
a flange;
a distribution block extending from the flange;
a primary gas fitting for supplying a main gas fuel to the distribution block;
a gas inlet passage formed in the distribution block and extending into the distribution block from the primary gas fitting, the gas inlet passage being in flow communication with the primary gas fitting;
a first primary passage formed in the distribution block and in flow communication with the gas inlet passage;
a second primary passage formed in the distribution block and in flow communication with the gas inlet passage and in a first parallel configuration with the first primary passage;
a secondary passage formed in the distribution block and in flow communication with the gas inlet passage and in a second parallel configuration with the first primary passage and in a third parallel configuration with the second primary passage;
an injector head including an injector body;
a primary gas gallery formed in the injector body, the primary gas gallery having an annular shape;
a first primary tube extending from the distribution block to the injector head, the first primary tube being in flow communication with the first primary passage and the primary gas gallery;
a second primary tube extending from the distribution block to the injector head, the second primary tube being in flow communication with the second primary passage and the primary gas gallery;
a secondary tube extending from the distribution block to the injector head to support the injector head and prevent deflection of the injector head, the secondary tube being in flow communication with the secondary passage and the primary gas gallery; wherein the distribution block is configured to distribute the main gas fuel to the primary gas gallery through the first primary tube, the second primary tube, and the secondary tube;
wherein the first primary passage, the second primary passage and the secondary passage all intersect at the gas inlet passage; and
wherein the first primary passage, the second primary passage, and the secondary passage are cross-drilled into the distribution block, and wherein the distribution block includes a first plug at a first end of the first primary passage, a second plug at a second end of the second primary passage, and a third plug at a third end of the secondary passage.

7. The fuel injector of claim 6, wherein the distribution block is integral to the flange and extends axially from the flange relative to an assembly axis of the fuel injector.

8. The fuel injector of claim 6, wherein the gas inlet passage extends through the flange and the primary gas fitting is affixed to the flange.

9. The fuel injector of claim 6, further comprising a tube stem extending through the flange to the injector head, the tube stem defining a pilot gas passage for providing a pilot gas fuel to the injector head.

10. The fuel injector of claim 6, further comprising:
a first primary tube port formed in the distribution block and fluidly connecting the first primary passage to the first primary tube;
a second primary tube port formed in the distribution block and fluidly connecting the second primary passage to the second primary tube; and
a secondary tube port formed in the distribution block and fluidly connecting the secondary passage to the secondary tube.

11. A fuel injector for a gas turbine engine, comprising:
a flange assembly including
a flange, and
a distribution block extending from the flange;
an injector head including
an injector body,
an inner premix tube joined to the injector body, the inner premix tube including a premix tube inner surface, and
an outer premix barrel joined to the injector body, the outer premix barrel including
a plurality of vanes, and
a premix tube outer surface located outward from the premix tube inner surface, the premix tube outer surface and the premix tube inner surface forming a premix passage that directs a mixture of a main gas fuel and air into a combustion chamber of the gas turbine engine; and
a single main gas fuel circuit for providing the main gas fuel to the premix passage, the single main gas fuel circuit including a primary gas fitting for supplying the main gas fuel to the distribution block, a gas inlet passage formed in the flange assembly and extending from the primary gas fitting into the distribution block, the gas inlet passage in flow communication with the primary gas fitting, a first primary passage formed in the distribution block and in flow communication with the gas inlet passage, a second primary passage formed in the distribution block and in flow communication with the gas inlet passage, a secondary passage formed in the distribution block and in flow communication with the gas inlet passage, a first primary tube extending from the distribution block to the injector body in flow communication with the first primary passage, a second primary tube extending from the distribution block to the injector body in flow communication with the second primary passage, a secondary tube extending from the distribution block to the injector body in flow communication with the secondary passage, a primary gas gallery formed in the injector body and in flow communication with the first primary tube, the second primary tube, and the secondary tube, wherein each of the first primary tube, the second primary tube, and the secondary tube provide a parallel path for the main gas fuel to the primary gas gallery from the primary gas fitting, a plurality of body primary gas passages extending from the primary gas gallery, a plurality of vane primary gas passages extending into the plurality of vanes and in flow communication with the plurality of body primary gas passages, and a plurality of primary gas outlets extending from the plurality of vane primary gas passages to the premix passage, wherein the first primary passage, the second primary passage and the secondary passage all intersect at the gas inlet passage; and wherein the first primary passage, the second primary passage, and the secondary passage are cross-drilled into the distribution block, and wherein the flange assembly includes a first plug at a first end of the first primary passage, a second plug at a second end of the second primary passage, and a third plug at a third end of the secondary passage.

12. The fuel injector of claim 11, wherein the distribution block is integral to the flange and extends axially from the flange relative to an assembly axis of the fuel injector, and wherein the gas inlet passage extends through the flange and the primary gas fitting is affixed to the flange.

13. The fuel injector of claim 11, further comprising:
a tube stem extending through the flange to the injector head;
a pilot gas passage formed in the tube stem for providing a pilot gas fuel to the injector head,
a main liquid tube cavity formed in the tube stem for providing a main liquid fuel to the injector head, and
a pilot liquid tube cavity formed in the tube stem for providing a pilot liquid fuel to the injector head.

14. The fuel injector of claim 11, wherein the secondary tube extends from the distribution block to the injector head to support the injector head and prevent deflection of the injector head.

* * * * *